(12) United States Patent
Swanson et al.

(10) Patent No.: US 9,103,673 B2
(45) Date of Patent: Aug. 11, 2015

(54) INERTIAL SENSOR USING SLIDING PLANE PROXIMITY SWITCHES

(71) Applicants: Paul David Swanson, Santee, CA (US); Richard L. Waters, San Diego, CA (US); Charles H. Tally, San Diego, CA (US); Andrew Wang, San Diego, CA (US)

(72) Inventors: Paul David Swanson, Santee, CA (US); Richard L. Waters, San Diego, CA (US); Charles H. Tally, San Diego, CA (US); Andrew Wang, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 216 days.

(21) Appl. No.: 13/847,539

(22) Filed: Mar. 20, 2013

(65) Prior Publication Data
US 2014/0047918 A1 Feb. 20, 2014

Related U.S. Application Data

(63) Continuation-in-part of application No. 13/168,603, filed on Jun. 24, 2011.

(51) Int. Cl.
*G01C 19/56* (2012.01)
*G01P 15/097* (2006.01)
*G01P 15/125* (2006.01)

(52) U.S. Cl.
CPC .............. *G01C 19/56* (2013.01); *G01P 15/097* (2013.01); *G01P 15/125* (2013.01)

(58) Field of Classification Search
USPC ....................................................... 324/76.11
See application file for complete search history.

(56) References Cited

U.S. PATENT DOCUMENTS

| | | | | |
|---|---|---|---|---|
| 6,756,247 | B1* | 6/2004 | Davis et al. | 438/52 |
| 2009/0045603 | A1* | 2/2009 | Huntimer | 280/455.1 |
| 2010/0257933 | A1* | 10/2010 | Verjus et al. | 73/504.04 |

* cited by examiner

*Primary Examiner* — Thomas F Valone
(74) *Attorney, Agent, or Firm* — SPAWAR Systems Center Pacific; Kyle Eppele; J. Eric Anderson (57) ABSTRACT

A time-domain inertial sensor comprising: a support structure having an electrode plane parallel to an x-y plane of an x-y-z mutually orthogonal coordinate system, wherein the support structure's largest dimension lies within the x-y plane; a proof mass having a first surface parallel to the x-y plane; wherein the proof mass is springedly coupled to the support structure such that the first surface is separated from the electrode plane by a gap; a driver configured to drive the proof mass to oscillate with respect to the support structure in approximately only the x-direction such that, while oscillating, the gap does not vary significantly; and a first, time-domain, proximity switch disposed to switch from an open state to a closed state each time the proof mass is in a first reference position with respect to the support structure.

14 Claims, 14 Drawing Sheets

INERTIAL SENSOR USING SLIDING PLANE PROXIMITY SWITCHES

CROSS-REFERENCE TO RELATED APPLICATION

This application is a continuation-in-part of U.S. application Ser. No. 13/168,603, filed 24 Jun. 2011, titled "Apparatus and Methods for Time Domain Measurement of Oscillation Perturbations" (Navy Case #100809), which application is hereby incorporated by reference herein in its entirety for its teachings, and referred to hereafter as "the parent application."

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 101875.

BACKGROUND OF THE INVENTION

This invention relates to the field of time-domain, inertial sensors. One example of a time-domain inertial sensor is an accelerometer wherein by measuring the times at which a harmonically oscillating proof mass passes predefined reference positions, the inertial acceleration can be determined.

SUMMARY

Disclosed herein is a time-domain inertial sensor comprising a support structure, a proof mass, a driver, and a first, time-domain, proximity switch. The support structure may have an electrode plane parallel to an x-y plane of an x-y-z mutually orthogonal coordinate system, and the support structure's largest dimension lies within the x-y plane. The proof mass may have a first surface parallel to the x-y plane and the proof mass may be springedly coupled to the support structure such that the first surface is separated from the electrode plane by a gap. The driver may be configured to drive the proof mass to oscillate with respect to the support structure in approximately only the x-direction such that, while oscillating, the gap does not vary significantly. The first, time-domain, proximity switch may be disposed to switch from an open state to a closed state each time the proof mass is in a first reference position with respect to the support structure.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
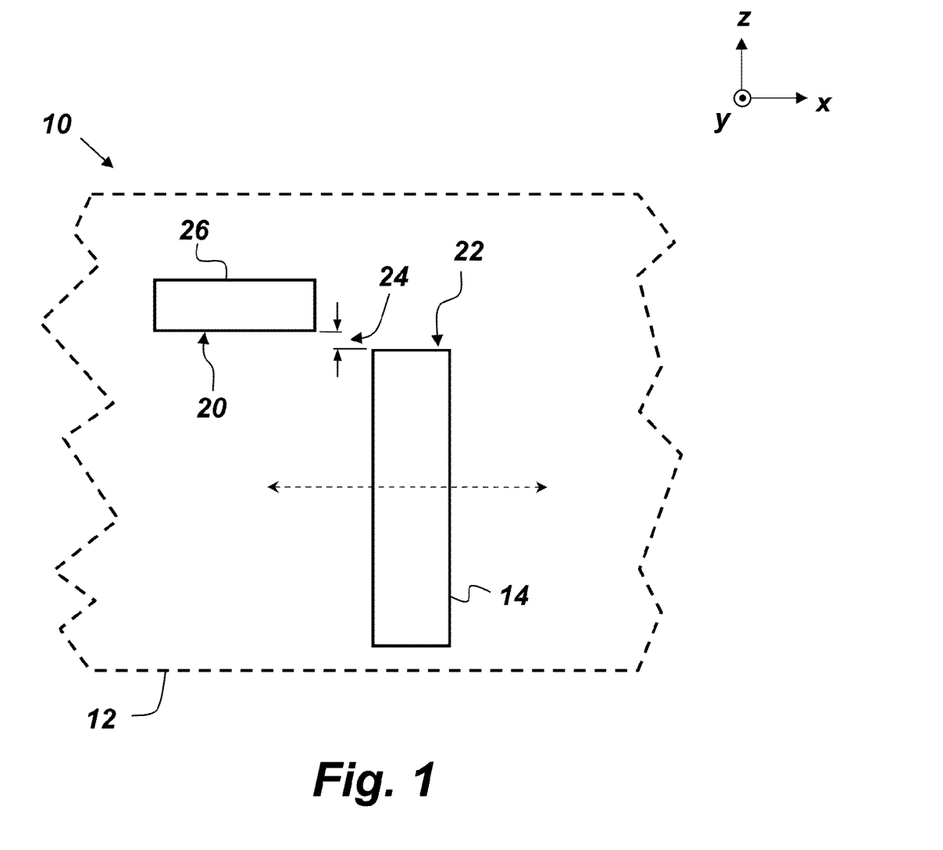
FIG. 1 is a front-view illustration of an embodiment of a time-domain inertial sensor.

FIG. 1 is a front-view illustration of a generalized view of a time-domain inertial sensor 10 which comprises a support structure 12, a proof mass 14, a driver 16 (shown in FIG. 2), and a first, time-domain proximity switch 18. The support structure 12 has an electrode plane 20 which is parallel to an x-y plane of an x-y-z mutually orthogonal coordinate system. The largest dimension of the support structure 12 lies within the x-y plane. The proof mass 14 has a first surface 22 which is parallel to the x-y plane, and the proof mass 14 is springedly coupled to the support structure 12 such that the first surface 22 is separated from the electrode plane 20 by a gap 24. The driver 16 is configured to drive the proof mass 14 to oscillate with respect to the support structure 12 in approximately only the x-direction such that, while oscillating, the gap 24 does not vary significantly. The first proximity switch 18 is disposed to switch from an open state to a closed state each time the proof mass 14 is in a first reference position with respect to the support structure 12. For example, in the embodiment of the sensor 10 shown in FIG. 1, the first proximity switch 18 may be configured to switch to a closed state, each time the proof mass 14 passes under a feature 26 of the support structure 12, where the bottom of the feature 26 defines the electrode plane 20.

The inertial sensor 10 may be manufactured on any scale. For example, in one embodiment the inertial sensor 10 may be monolithically integrated into a micro-electro-mechanical system (MEMS) device. The inertial sensor 10 may be used in any orientation. Although the x-y-z coordinate system is depicted in the drawings and referred to herein, it is to be understood that the first, second, and third directions/axes, as used herein, may correspond to any three mutually-orthogonal directions/axes in any three-dimensional coordinate system.

The support structure 12 may be any size and shape, and be made of any material capable of providing rigid support for the inertial sensor 10 such that the support structure 12 does not significantly flex and/or deform when exposed to lateral and rotational accelerations of the inertial sensor 10.

The proof mass 14 may be any mass that can be springedly coupled to the support structure 12 such that the proof mass 14 moves in response to lateral and/or rotational accelerations of the inertial sensor 10. A suitable example of the proof mass 14 includes, but is not limited to, a cantilever arm monolithically integrated into the support structure 12, such as is shown in FIG. 2.

The driver 16 may each be any apparatus capable of causing the proof mass 14 to oscillate at any desired frequency in the x-direction with respect to the support structure 12. Suitable examples of the driver 16 include, but are not limited to, variable area actuators, such as electrostatic comb drives (such as are portrayed in FIG. 2), variable gap actuators, such as parallel plate actuators, and other electro-magnetic or piezoelectric mechanisms of actuation. The proof mass 14 may be driven using a continuous oscillating force or by periodic "delta function" forces in phase with the proof mass' harmonic resonance.

The first proximity switch 18 may be any apparatus capable of producing digital signals corresponding to various positions of the proof mass 14 with respect to the support structure 12. In other words, the first proximity switch 18 may be any device capable of experiencing a change in state based on positional changes of the proof mass 14 relative to the support structure 12. Suitable examples of the first proximity switch 18 include, but are not limited to, an electron tunneling switch, a capacitive switch, an optical shutter switch, and a magnetic switch. A purpose of the first proximity switch 18 is to localize the position of the section of the proof mass 14 to which the first proximity switch 18 is attached with respect to the support structure 12 such that an accurate acceleration-independent phase measurement can be performed—thereby increasing stability of a phased-locked loop closure and reducing overall phase noise and jitter of the inertial sensor 10.

Figure 2:
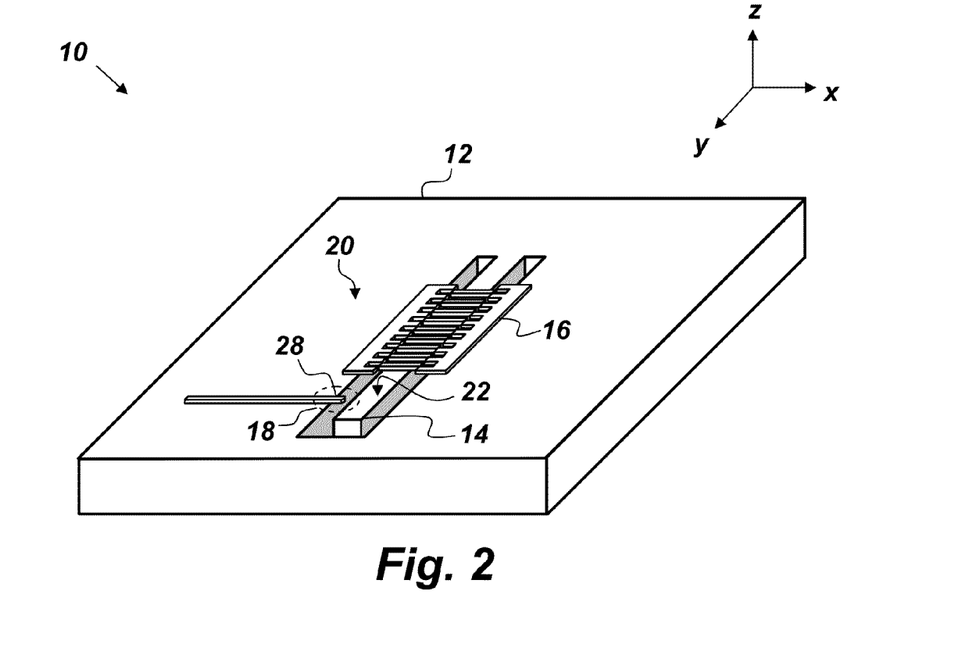
FIG. 2 is a perspective view of an embodiment of a time-domain inertial sensor.

FIG. 2 is a perspective view of an embodiment of the inertial sensor 10. In this embodiment, the support structure 12 and the proof mass 14 are monolithically integrated. Also shown in this embodiment, the first proximity switch 18 is an electron tunneling tip switch comprising a tunneling tip 28 rigidly attached to the support structure 12 on the electrode plane 20 such that when the free end of the proof mass 14 and the tunneling tip 28 are aligned in the z-direction tunneling occurs between the first surface 22 and the tunneling tip 28. The tunneling tip 28 may be sufficiently electroplated in the z-direction to enable it to be self-supporting over the area through which the proof mass 14 oscillates.

Figure 3:
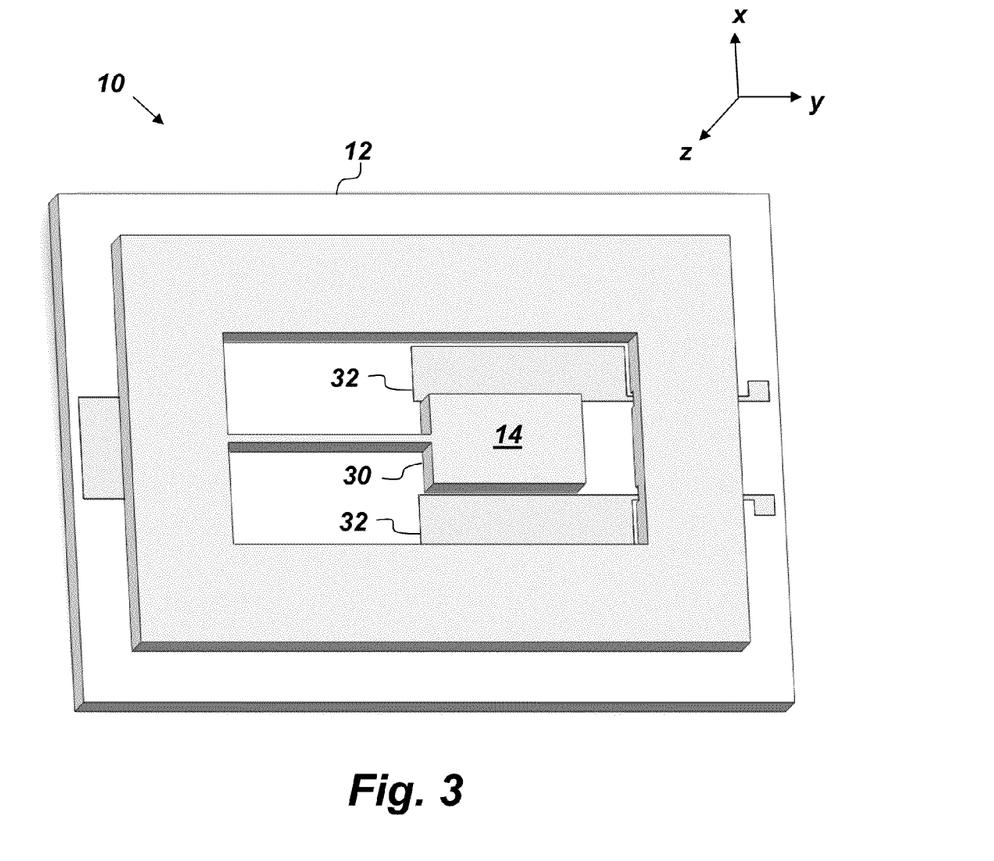
FIG. 3 is a perspective view of an embodiment of a time-domain inertial sensor.
Figure 4A:
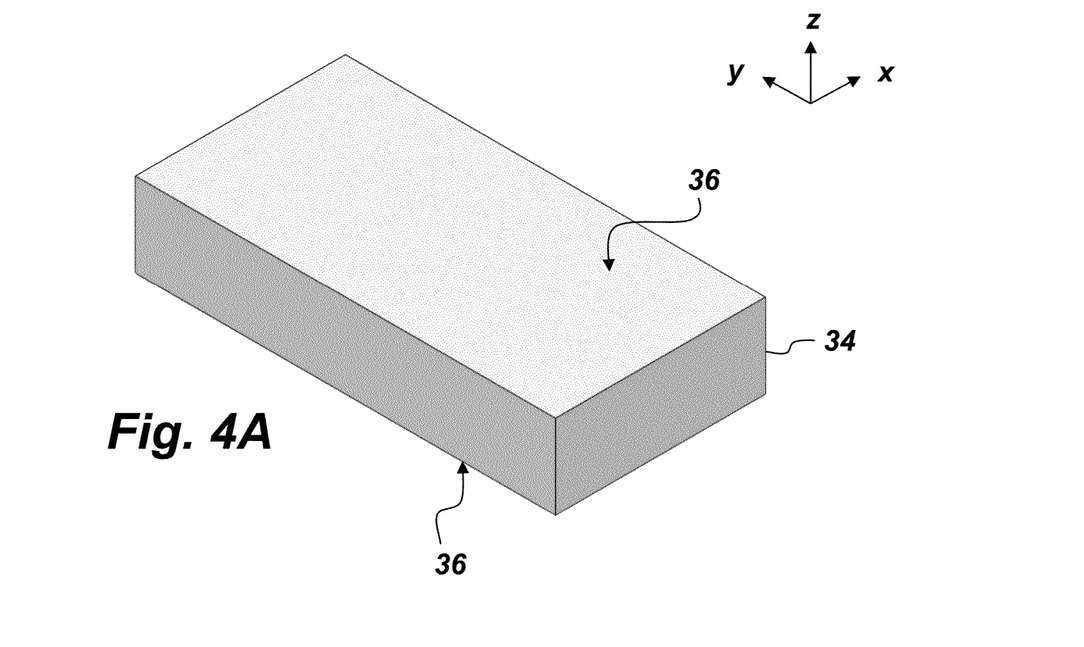
FIG. 4A is a perspective view of a manufacturing step of a time-domain inertial sensor.
Figure 4B:
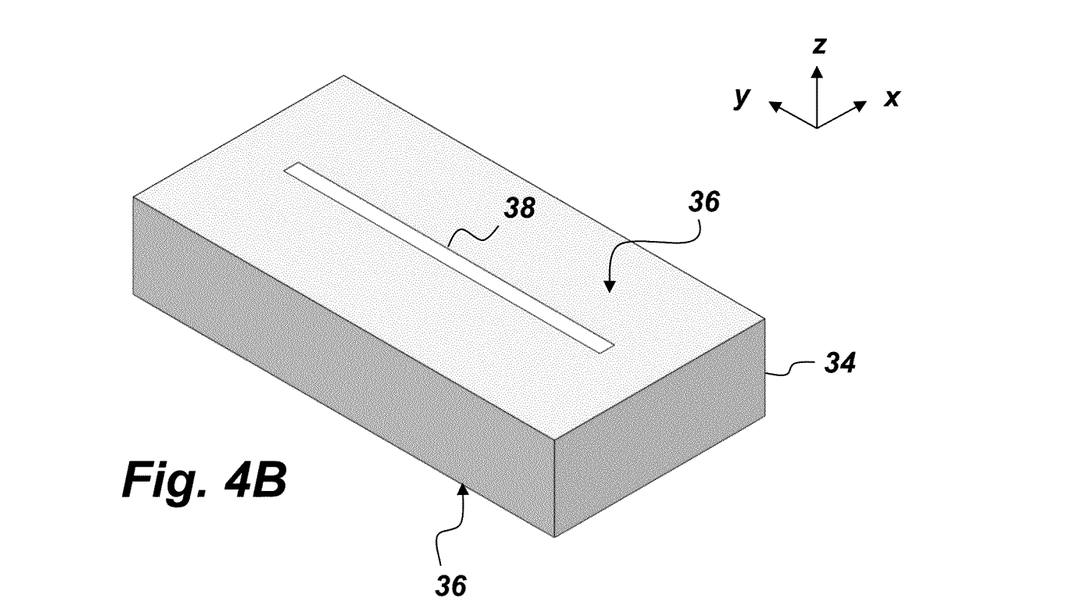
FIG. 4B is a perspective view of a manufacturing step of a time-domain inertial sensor.
Figure 5A:
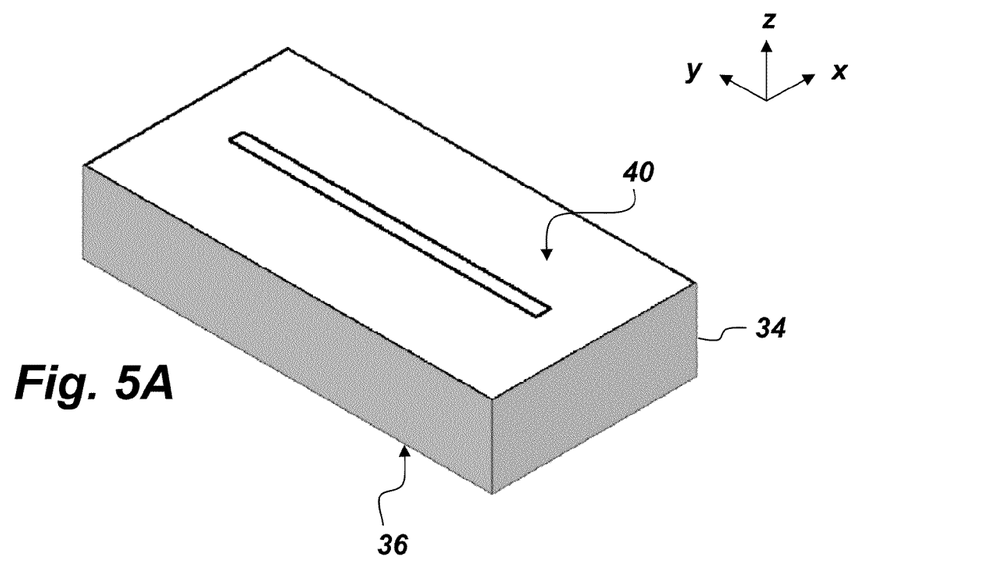
FIG. 5A is a perspective view of a manufacturing step of a time-domain inertial sensor.
Figure 5B:
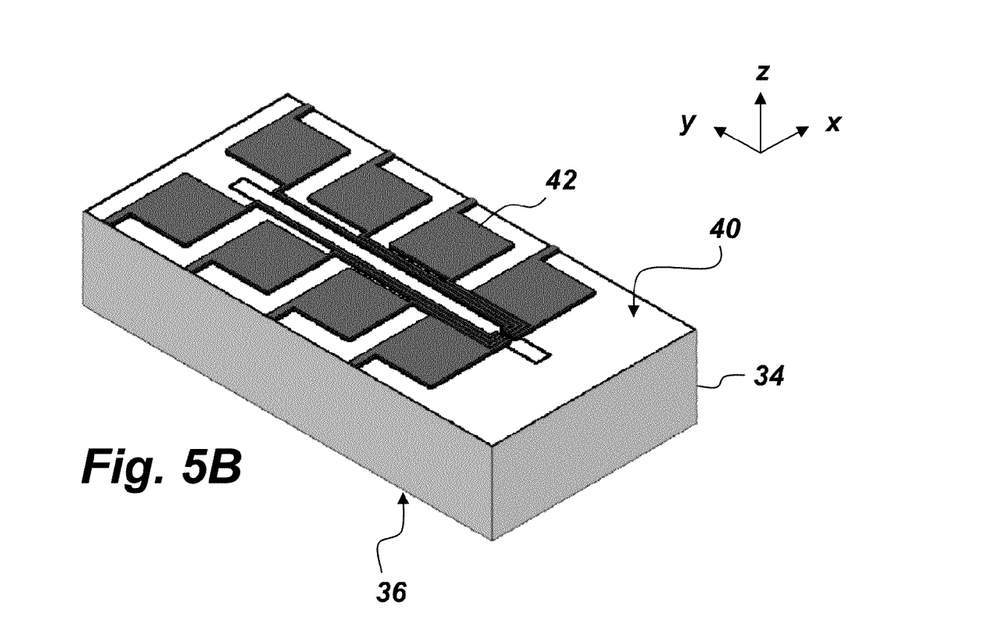
FIG. 5B is a perspective view of a manufacturing step of a time-domain inertial sensor.
Figure 6A:
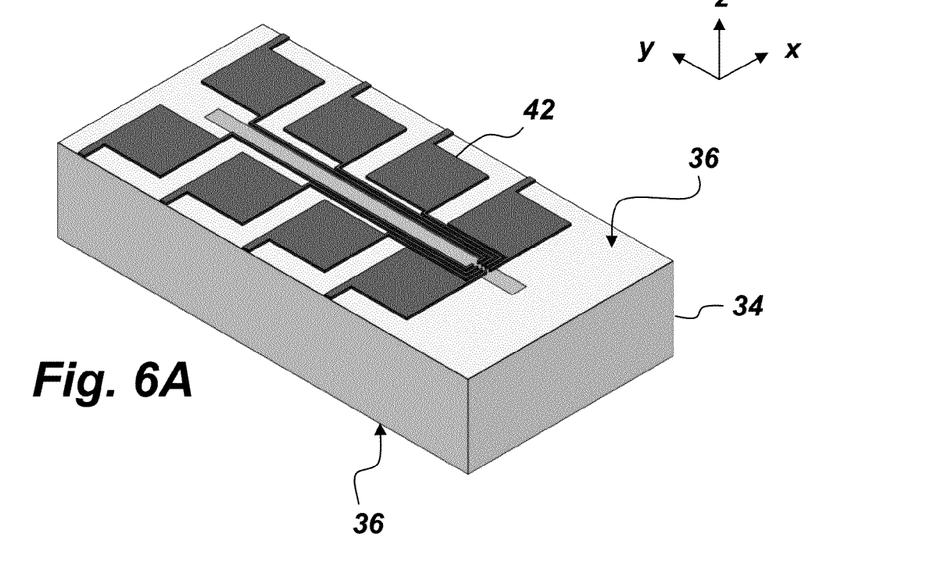
FIG. 6A is a perspective view of a manufacturing step of a time-domain inertial sensor.
Figure 6B:
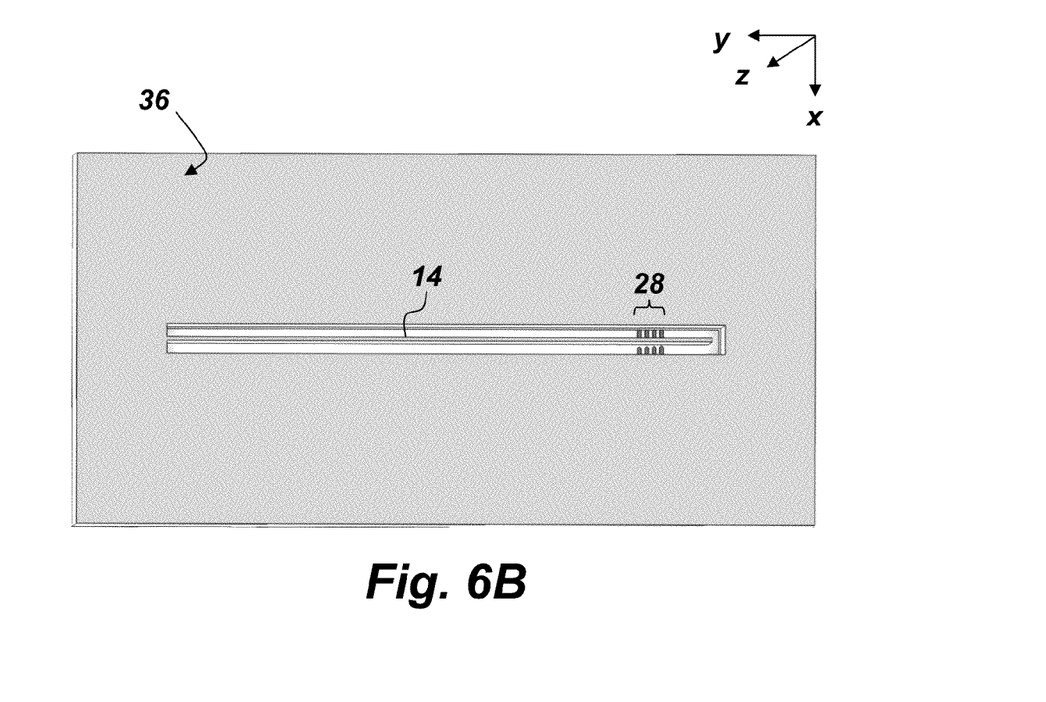
FIG. 6B is a bottom view of a manufacturing step of a time-domain inertial sensor.

FIG. 3 is a perspective view of an embodiment of the inertial sensor 10 where the first proximity switch 18 is a capacitive switch. In this embodiment, the proof mass 14 serves as a first half 30 of the first proximity switch 18, and a second half 32 of the proximity switch 18 is mounted to the support structure 12. In this embodiment, the closed state of the first proximity switch 18 occurs at the proof mass 14 location where there is peak capacitance between the first and second halves 30 and 32. The support structure 12 may comprise a cap wafer and the second half 32 of the proximity switch 18 may be attached to the cap wafer.

Figure 7:
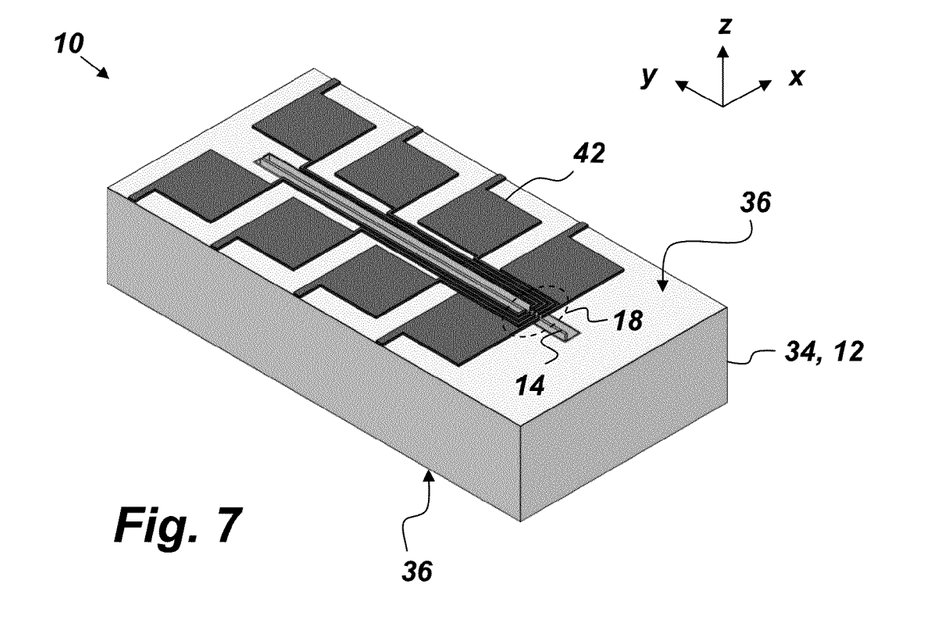
FIG. 7 is a perspective view of an embodiment of a time-domain inertial sensor.

FIGS. 4A through 7 illustrate example manufacturing steps of an accelerometer embodiment of the inertial sensor 10. The example process starts with a double polished 0.4 silicon wafer 34. Next, a one-micron thermal-oxide layer 36 may be deposited on the top and bottom of the silicon wafer 34 such as is shown in perspective view in FIG. 4A. Next, a pattern 38 may be etched in the top oxide layer 36, as shown in FIG. 4B. Next, a 30 nm Tungsten layer 40 may be deposited on the top oxide layer 36, as shown in FIG. 5A. Next, a 100 nm Copper lift-off may be deposited on the Tungsten layer 40 followed by a 10-micron copper plating 42 using same photo-resist mask, such as is shown in FIG. 5B. Next, the exposed sections of the Tungsten layer 40 may be removed, as shown in FIG. 6A. Next, FIG. 6B illustrates how the back oxide layer 36 may be patterned (front to back alignment), the silicon substrate wafer 34 may be deep etched all the way through, and any exposed sections of the Tungsten layer 40 may be removed. In FIG. 6B, the bottom of the proof mass 14 is now visible as well as the bottom of several tunneling tips 28. A perspective view of the finished accelerometer embodiment of the inertial sensor 10 is shown in FIG. 7. In this embodiment, the cantilever proof mass 14 can freely move under the copper tunneling tips 28, which are separated by 30 nm gap—left over after removing the exposed sections of the sacrificial Tungsten layer 40.

The inertial sensor 10 may comprise many proximity switches 18, such as is shown in FIG. 7. The multiple proximity switches may be used to determine when the harmonically oscillating proof mass 14 passes known locations, so that the motion with respect to time can be reconstructed and forces perturbing the harmonic oscillation can be determined. When the proximity switches 18 are electron tunneling switches, the critical dimension is the tunneling gap 24 of the electron tunneling proximity switches. The most controllable dimension in semiconductor MEMS devices is the thickness of deposited layers on the surface of the substrate. In the embodiment of the inertial sensor 10 where the proximity switches 18 are electron tunneling switches, the thickness of a deposited (or grown) layer defines the tunneling distance. This limits the number inertial axes that can be integrated onto a single chip, but greatly reduces the cost and complexity of device fabrication, and should make the operation of the tunneling proximity switches more uniform. In an embodiment of the inertial sensor 10, the proof mass 14 slides under a tunneling tip 28 mounted to the support structure 12, and tunneling occurs as long as the conductive proof mass 14 is under (and in close proximity) to the tunneling tip 28.

As shown in FIGS. 4A through 7, the separation of the parallel planes that define the top of the heavily doped conductive silicon proof mass 14 and the bottom of the conductive fixed tunneling tip 28 may be defined by a planar deposition of a sacrificial material (e.g., Tungsten layer 40). This material is deposited on the silicon substrate wafer 34 before the patterned deposition of the fixed tunneling tip 28. The tunneling tip 28 is patterned over a region of silicon which is to be totally removed (by etching from the back) in order to allow the proof mass 14 to move within the plane of the surface of the silicon substrate wafer 34. All motion may be constrained to the plane of the substrate wafer 34 since the tunneling tips 28 reside just above it and vertical motion of the proof mass 14 could damage the tunneling tips 28. For example, cross beams may be rigidly attached to the support structure and positioned with respect to the proof mass so as to restrict motion of the proof mass in the z-direction. In order to maintain proper tunneling distance between the tunneling tips 28 and the proof mass 14, warpage due to stress in the silicon proof mass 14, the spring and the support structure 12 and/or in the tunneling tips 28 themselves should be kept low. For this purpose, any dielectrics grown or deposited on one side of the silicon substrate wafer 34 may have a mirror image dielectric grown or deposited on the other side to cancel any resulting stress. The tunneling tips 28 may be made of a conductive material, which exhibits little or no tinsel or compressive stress, and that does not etch in the Sulfur Hexafluoride ($SF_6$) chemistry—which may be used to dry etch vertical walls straight through the silicon wafer 34. Copper may be used for this purpose since it does to form a product in fluorine chemistry, and can be easily electroplated to considerable thickness (room temperature process with optimized growth rate to induce no stress) onto a thin evaporated seed layer.

Figure 8A:
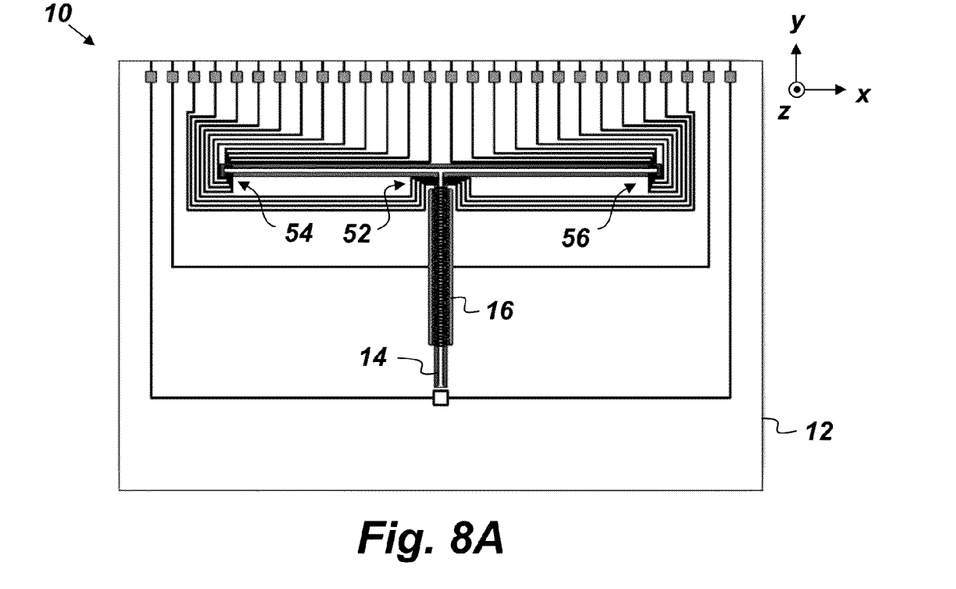
FIG. 8A is a top view of an embodiment of a time-domain inertial sensor.
Figure 8B:
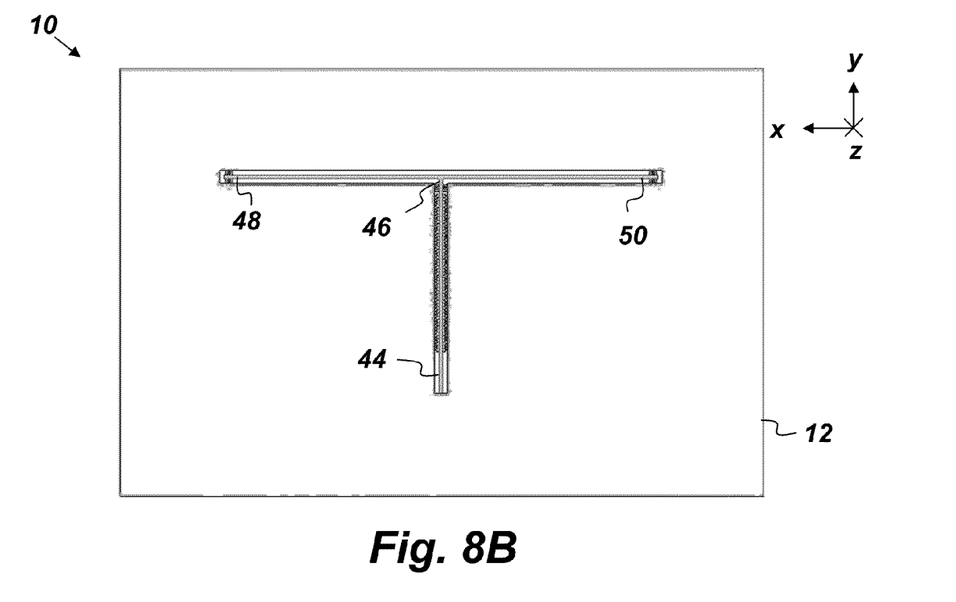
FIG. 8B is a bottom view of an embodiment of a time-domain inertial sensor.
Figure 9A:
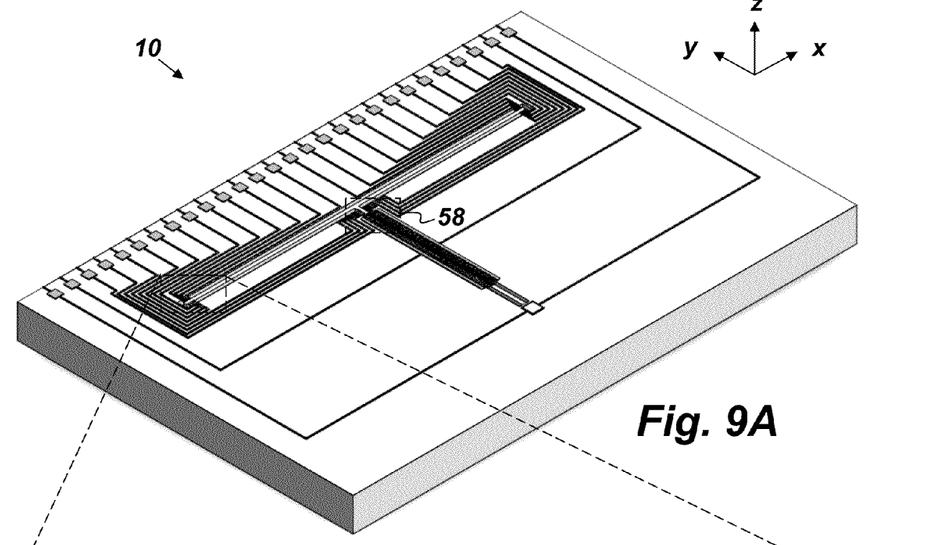
FIG. 9A is a perspective view of an embodiment of a time-domain inertial sensor.
Figure 9B:
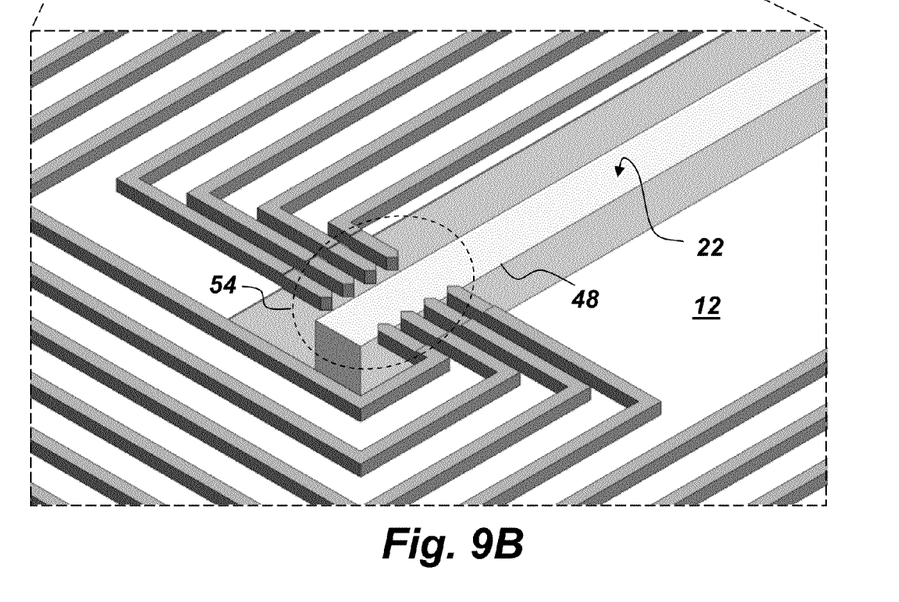
FIG. 9B is a magnified, perspective view of a section of the time-domain inertial sensor shown in FIG. 9A.
Figure 10:
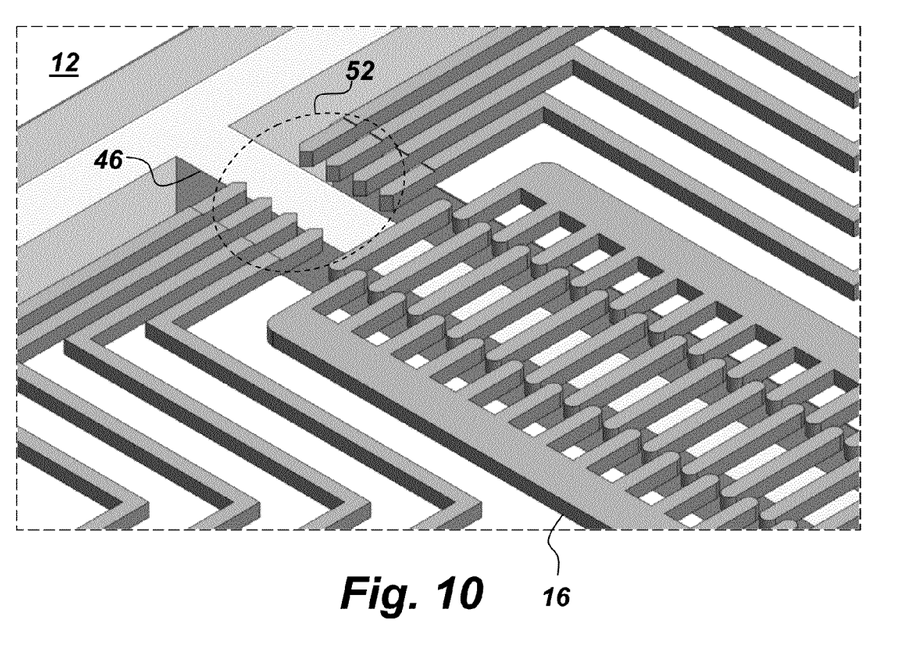
FIG. 10 is a magnified, perspective view of a section of the time-domain inertial sensor shown in FIG. 9A.

FIGS. 8A through 10B illustrate a time-domain gryoscope-accelerometer combination embodiment of the inertial sensor 10. This embodiment uses tunneling tips 28 to monitor the motion of the gyroscope driving mass (also functioning as the accelerometer proof mass) and using tunneling tips to monitor the motion of the cantilevers measuring the Corilois forces for rotations around the z (vertical) axis. FIGS. 8A and 8B are top and bottom views respectively of the gyroscope-accelerometer embodiment of the inertial sensor 10. In this embodiment, the first surface 22 of the proof mass 14 is T-shaped and comprises a base 44, a neck 46, and first and second free ends 48 and 50 respectively. The base 44 is attached to the support structure 12, and the neck 46 is operatively coupled to a first plurality of proximity switches 52. The first free end 48 is operatively coupled to a second plurality of proximity switches 54, and the second free end 50 is operatively coupled to a third plurality of proximity switches 56. FIG. 9A is a perspective view of the gyroscope-accelerometer embodiment of the inertial sensor 10. FIG. 9B is an expanded view of the first free end 48 and the second plurality of proximity switches 54. FIG. 10 is an expanded view of the neck 46 and the first plurality of proximity switches 52. FIG. 10 corresponds to the area of FIG. 9A designated by the dashed-line box 58.

Figure 11:
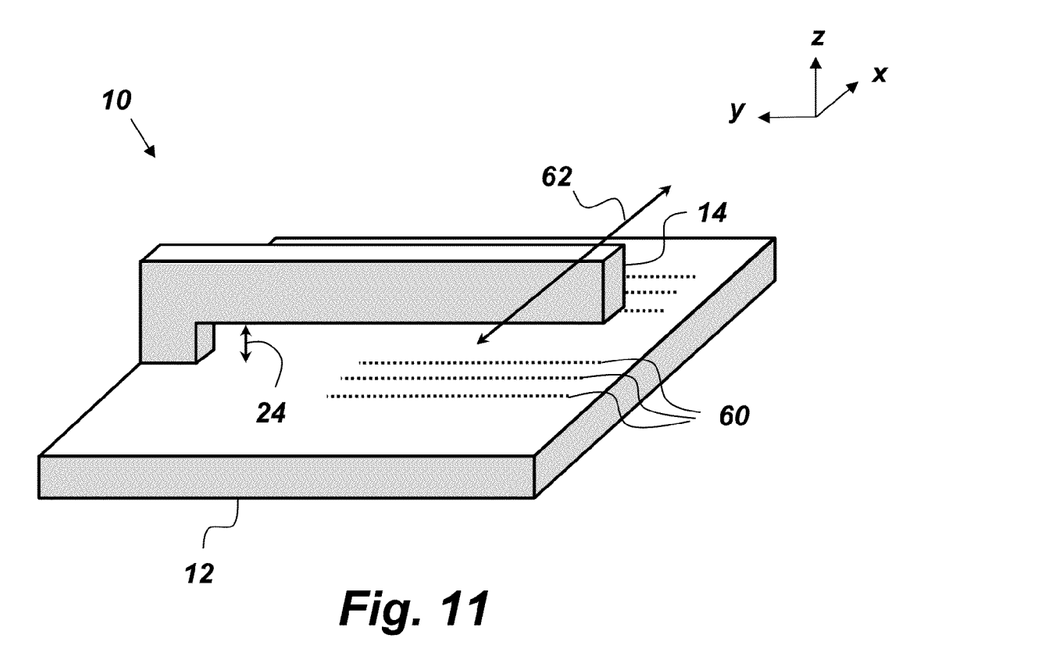
FIG. 11 is a perspective view of an embodiment of a time-domain inertial sensor.

FIG. 11 is a perspective view of another embodiment of the inertial sensor 10. In this embodiment, the first proximity switch 18 comprises one or more thin wires 60 and the proof mass 14, which together function as a capacitive switch(es). The capacitive switch is based on the principle that conductors (or semiconductors) passing nearby each other for brief periods of time result in rapid capacitive changes. This changing capacitance, in turn, induces sharp current pulses in the conductors which can be used as accurate time-trigger data to determine the moment of closest approach. In the embodiment shown in FIG. 11, the proof mass 14 is a cantilever beam attached to the support structure 12 such that the small, capacitive gap 24 exists between the beam and the support structure 12. The beam is allowed to oscillate parallel to the plane of the support structure 12 in the x-direction, as indicated in FIG. 11 by double-arrow 62. The beam is relatively stiff in the other two dimensions (i.e., the y and z-directions). On the support structure 12, one or more thin wires 60 are arranged at predefined locations under where the cantilever will pass during oscillation. Once the beam is set into oscillation, when the beam passes these wires 60, a sharp capacitive change occurs generating a current pulse in the corresponding wire 60.

To model and quantify the current pulse generated by the beam passing a nearby parallel wire 60, one may first differentiate the general equation for the charge on a capacitor:

$$Q(t) = C(t)V(t) \rightarrow i_{trigger} = \frac{dQ}{dt} = \frac{dC}{dt}V(t) + \frac{dV}{dt}C(t), \quad (1)$$

where Q(t), C(t), and V(t) are respectively the time-varying charge on, capacitance of, and voltage across the capacitor. In this case, a parallel plate capacitor is formed between the long silicon beam passing nearby a wire 60 deposited on the substrate/support structure 12. By noting that the change in capacitance is due to the beam's motion (e.g. a changing amount of beam/wire overlap area), and by fixing the voltage between the beam and the wire, we can infer that $$\frac{dC}{dt} = \frac{\partial C}{\partial x}\frac{dx}{dt} \text{ and } V(t) = V_0 \text{ thus } \frac{dV}{dt} = 0, \quad (2)$$

where dx/dt is the velocity of the cantilever beam relative to the wire, and dV/dt is zero due to the fixed voltage level.

For simplicity, one can assume that the cantilever motion (x(t)) is sinusoidal during oscillation, and the wire is located very near the beam's oscillation center (defined at t=0). Thus, the beam velocity near that point can be estimated as:

$$x(t) = x_0\sin(\omega_0 t) \rightarrow \left.\frac{dx}{dt}\right|_{t=0} = v_{trigger} = x_0\omega_0, \quad (3)$$

Where $x_o$ is the amplitude of the beams oscillation and $\omega_o$ is the resonant angular frequency of the beam structure. The triggering current can be written by substituting results from equations (2) and (3) into equation (1):

$$i_{trigger} = \frac{\partial C}{\partial x}x_0\omega_0 V_0. \quad (4)$$

Figure 12:
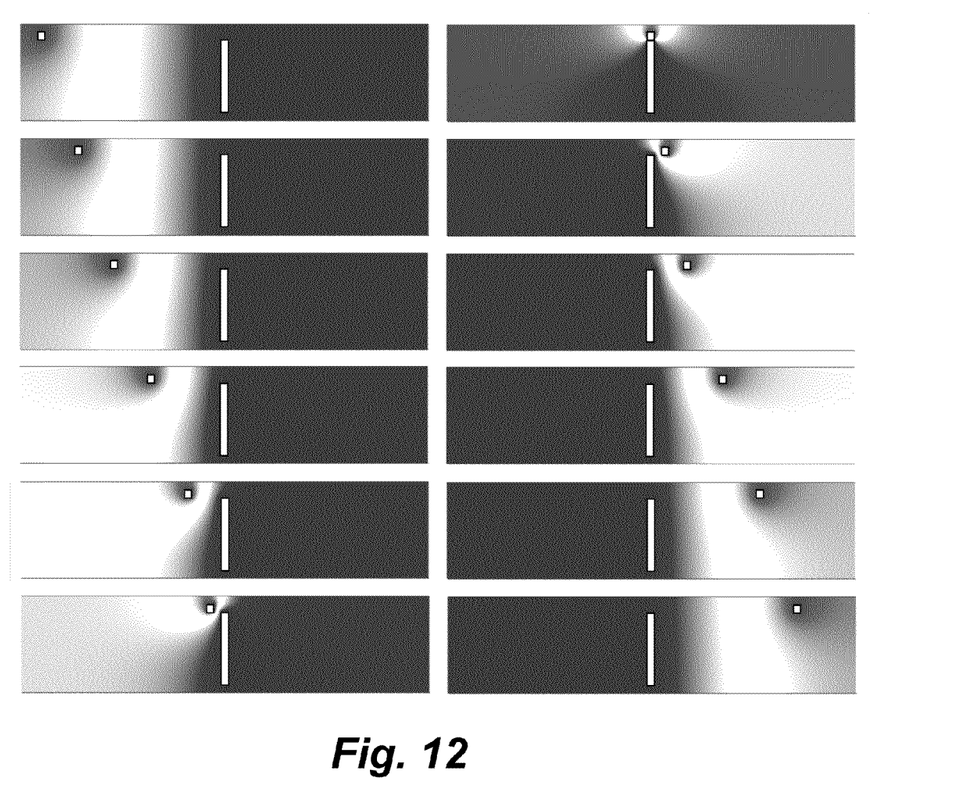
FIG. 12 is a series of plots showing a two-dimensional (2D) cross section of a square wire held at a fixed voltage passing just above a tall and narrow cantilever beam (rectangle) held at ground.
Figure 13A:
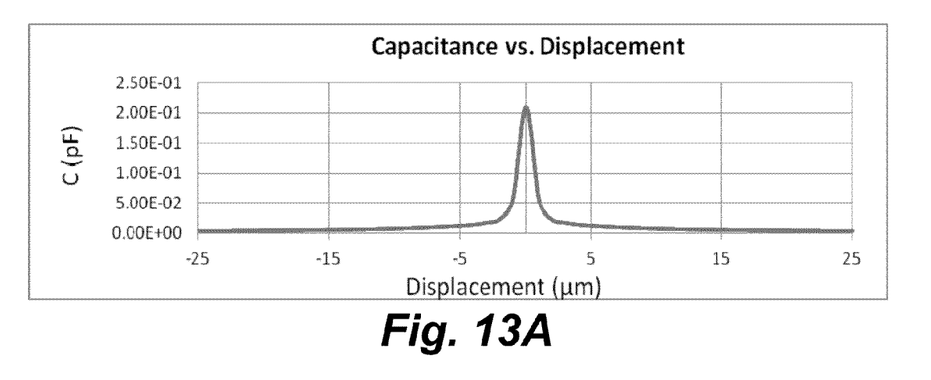
FIG. 13A is a plot of estimated capacitance of a capacitive proximity switch in pico-Farads (pF) as a function of the relative displacement between the cantilever beam and the thin wire depicted in FIG. 11.
Figure 13B:
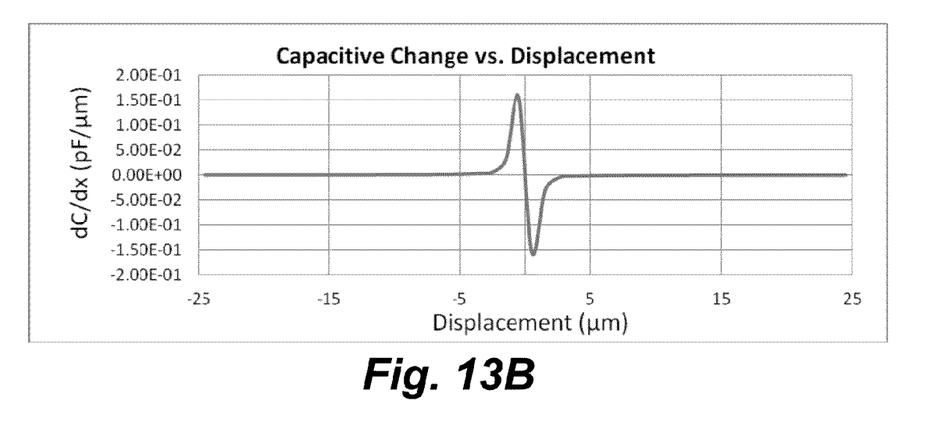
FIG. 13B is a plot showing the estimated change in capacitance in pico-Farads (pF) per micron (μm) as a function of the relative displacement between the cantilever beam and the wire.
Figure 13C:
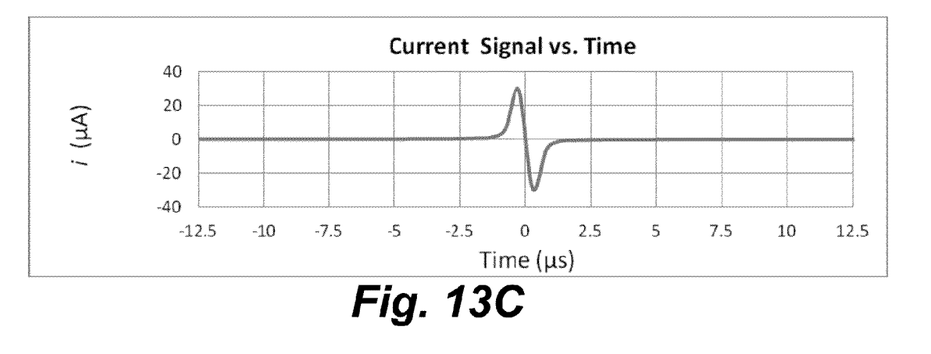
FIG. 13C is a plot showing the current i induced in the capacitive switch in micro-Amps (μA) plotted against time in micro-seconds (μs).

Finite element analysis software, such as COMSOL®, may be employed to generate realistic expectations for the dC/dx term in equation 4 (see FIGS. 12-13C). The simulation assumes a narrow silicon beam passes an equally wide wire of the same length as the beam. As the objects approach and pass nearby one another, a very sharp double current pulse is formed—first a positive pulse, followed immediately by negative pulse (see FIG. 13C). The zero-crossing between these two current pulses (see FIG. 13C at t=0) is used to define the exact triggering "moment," or the closed state of the proximity switch. The zero-crossing point may be defined as the relative position of the proof mass 14 with respect to the support structure 12 where the current pulse reverses polarity—such as is shown in FIG. 13C at t=0. It should be noted that changes to the beam's oscillation amplitude and/or frequency, as well as any variation on the fixed voltage source, will cause the magnitude of the output current to change (see equation 4). The location of the zero-crossing triggering point, however, remains constant with the variation of these system parameters.

Further, any offset of the cantilever beam's oscillation due to inertial accelerations will cause an asymmetric warping of the output current as well as a reduction in the overall magnitude of the signal. The warping is due to the changing velocity of beam's tip over the interval of interest, while the reduction of magnitude is due to a relative reduction in velocity from the peak velocity which occurs only near zero-offset. Despite these changes, however, the location of the zero-crossing trigger instance will remain consistent, however, due to the fact that it occurs—by design—at the point of peak capacitance (when the wire and the beam are perfectly aligned). Since the zero-crossing in the capacitive switch is a well defined and consistent parameter, despite variation of system parameters, it serves as a good triggering mechanism (limited primarily by electronic noise in the voltage source and the time-triggering circuitry).

Fabrication of capacitive wires 60 and silicon cantilever beams (i.e., proof mass 14) are very well defined and controlled fabrication processes. The physical gap 24 between the beam and the wires may be defined by a vertically deposited film (a sacrificial layer) which is removed in the final steps of fabrication. This gap 24 can be quite small and well-controlled as the thickness of sacrificial thin films can be well-controlled during fabrication.

FIG. 12 is a series of plots showing a two-dimensional (2D) cross section of a square wire held at a fixed voltage passing just above a tall and narrow cantilever beam (rectangle) held at ground. This calculation may be used to compute the capacitive change of the system as the wire and cantilever approach and cross nearby (e.g. dC/dx). The time flow is from top left down then continuing from the top right down. The capacitance of the system was computed and used to generate subsequent plots shown in FIGS. 13A-13C.

FIG. 13A is a plot showing the estimated capacitance of a capacitive proximity switch in pico-Farads (pF) as a function of the relative displacement between the cantilever beam and the thin wire depicted in FIG. 11. This calculation assumes a MEMS scale device with a 2 micron (μm) wide wire held at a fixed voltage passing a 2 μm wide grounded silicon beam. The spacing between the wire and the cantilever is assumed to be 50 nanometers (nm) at closest approach. The peak capacitance achieved is 0.217 pico-Farads (a measurable quantity), occurs as expected when the objects are centered with respect to one another. The peak capacitance can be increased linearly by expanding either the wire width or length. If widened, the profile would be broadened.

FIG. 13B is a plot showing the estimated change in capacitance in pico-Farads (pF) per micron (μm) as a function of the relative displacement between the cantilever beam and the wire (e.g. the derivative of the plot shown in FIG. 11).

FIG. 13C is a plot showing the current i induced in the capacitive switch in micro-Amps (μA) plotted against time in micro-seconds (μs). Using the value of the spatial capacitance change (dC/dx) in FIG. 13A, combined with equation (4), the current induced in the a wire held at a fixed voltage of 100 Volts is plotted above in micro-Amps (μA) as a function of time in micro-seconds (μs). This assumes a cantilever beam with resonant frequency of 15 kHz oscillating at a fixed amplitude of ±20 μm. The zero crossing of this current output (at t=0) can be used to calculate the "time of crossing" as needed for the device operation.

Figure 14A:
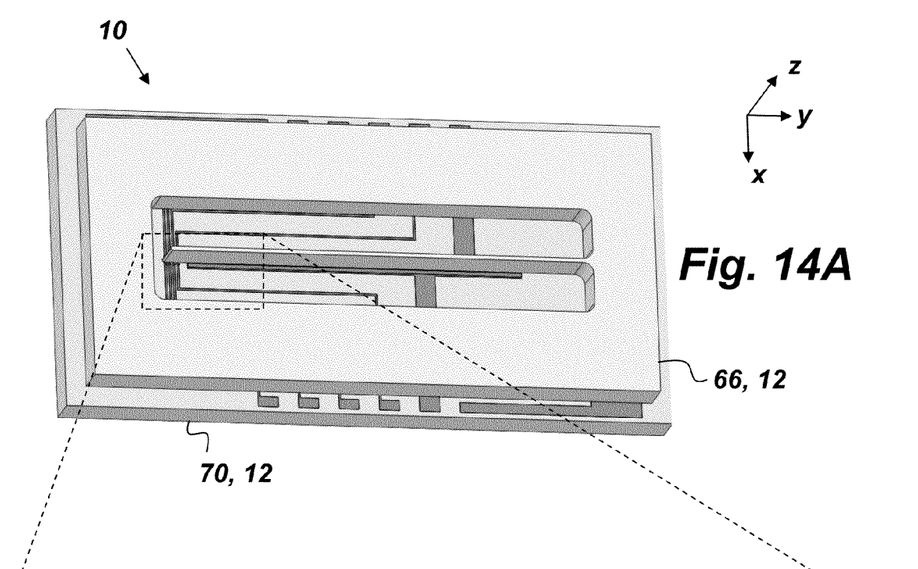
FIG. 14A is a perspective view of an embodiment of a time-domain inertial sensor.
Figure 14B:
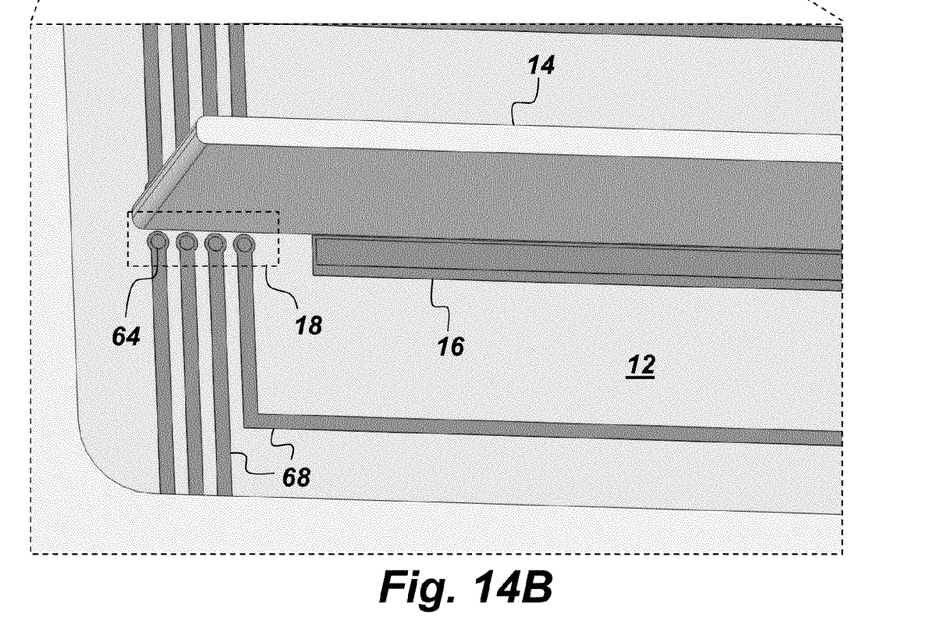
FIG. 14B is a magnified, perspective view of a section of the time-domain inertial sensor shown in FIG. 14A.

FIGS. 14A and 14B are perspective views of another embodiment of the inertial sensor 10. FIG. 14B is a magnified view of a section of the inertial sensor 10 shown in FIG. 14A. In this embodiment of the inertial sensor 10, the driver 16 comprises a pair of capacitive plates disposed on either side of the proof mass 14. The proximity switches 18 in this embodiment comprise electrodes 64, which are depicted as circles in FIG. 14B. In practice, the electrodes 64 may be deposited and patterned on top of a sacrificial layer on the top wafer 66 then bonded to wire traces 68 on a bottom wafer 70. When the cantilever proof mass 14 is defined by a deep silicon etch all the way through the top wafer and the sacrificial layer is removed, the thickness of the sacrificial layer is the distance from the electrodes 64 and the surface of the cantilever 14 when the cantilever proof mass 14 moves across the electrodes 64.

From the above description of the inertial sensor 10, it is manifest that various techniques may be used for implementing the concepts of inertial sensor 10 without departing from its scope. The described embodiments are to be considered in all respects as illustrative and not restrictive. It should also be understood that inertial sensor 10 is not limited to the particular embodiments described herein, but is capable of many embodiments without departing from the scope of the claims.

We claim:

1. A time-domain inertial sensor comprising:
   a support structure having an electrode plane parallel to an x-y plane of an x-y-z mutually orthogonal coordinate system, wherein the support structure's largest dimension lies within the x-y plane;
   a proof mass having a first surface parallel to the x-y plane; wherein the proof mass is springedly coupled to the support structure such that the first surface is separated from the electrode plane by a gap;
   a driver configured to drive the proof mass to oscillate with respect to the support structure in approximately only the x-direction such that, while oscillating, the gap does not vary significantly; and
   a first, time-domain, proximity switch disposed to switch from an open state to a closed state each time the proof mass is in a first reference position with respect to the support structure.

2. The time-domain inertial sensor of claim 1, wherein the support structure and the proof mass are monolithically integrated and the gap is fabricated by removing a sacrificial layer of material.

3. The time-domain inertial sensor of claim 1, wherein the first proximity switch is a capacitive switch.

4. The time-domain inertial sensor of claim 3, wherein the support structure comprises a cap wafer and half of the capacitive switch is attached to the cap wafer.

5. The time-domain inertial sensor of claim 3, wherein the first proximity switch comprises a first half mounted to the proof mass and a second half mounted to the support structure, and wherein the closed state of the first proximity switch is defined as a zero-crossing point where there is peak capacitance between the first and second halves.

6. The time-domain inertial sensor of claim 1, wherein the first proximity switch is an optical switch.

7. The time-domain inertial sensor of claim 1, wherein the first proximity switch is an electron tunneling tip switch comprising a tunneling tip rigidly attached to the support structure on the electrode plane such that when the proof mass is in the first reference position a section of the first surface and the tunneling tip are aligned in the z-direction such that electron tunneling occurs between the first surface and the tunneling tip.

8. The time-domain inertial sensor of claim 7, wherein the tunneling tips are sufficiently electroplated in the z-direction to enable them to be self-supporting over an area through which the proof mass oscillates.

9. The time-domain inertial sensor of claim 1, wherein the driver comprises feedback circuitry configured to generate an electrical signal to maintain operation on resonance.

10. The time-domain inertial sensor of claim 1, wherein the proof mass driver comprises capacitive comb drives.

11. The time-domain inertial sensor of claim 1, wherein the proof mass and the substrate are designed to experience minimal warpage due to stress.

12. The time-domain inertial sensor of claim 1, further comprising a plurality of time-domain proximity switches, each digital proximity switch being disposed to switch from an open state to a closed state each time the proof mass is in a corresponding reference position with respect to the support structure.

13. The time-domain inertial sensor of claim 1, further comprising a second, time-domain, digital proximity switch disposed to switch from an open state to a closed state each time the proof mass is in the first reference position with respect to the support structure.

14. The time-domain inertial sensor of claim 12, wherein the first surface of the proof mass is T-shaped and comprises a base, a neck, and first and second free ends, wherein the base is attached to the support structure, the neck is operatively coupled to the first proximity switch, the first free end is operatively coupled to a second proximity switch, and the second free end is operatively coupled to a third proximity switch.

* * * * *